(12) United States Patent
Al-Najjar

(10) Patent No.: US 9,476,803 B2
(45) Date of Patent: Oct. 25, 2016

(54) METHOD AND AN APPARATUS FOR PREDICTING THE CONDITION OF A MACHINE OR A COMPONENT OF THE MACHINE

(71) Applicant: Basim Al-Najjar, Växjö (SE)

(72) Inventor: Basim Al-Najjar, Växjö (SE)

(73) Assignee: E-Maintenance Sweden AB, Växjö (SE)

( * ) Notice: Subject to any disclaimer, the term of this patent is extended or adjusted under 35 U.S.C. 154(b) by 0 days.

(21) Appl. No.: 14/768,605

(22) PCT Filed: Jan. 20, 2014

(86) PCT No.: PCT/EP2014/051006
§ 371 (c)(1),
(2) Date: Aug. 18, 2015

(87) PCT Pub. No.: WO2014/127937
PCT Pub. Date: Aug. 28, 2014

(65) Prior Publication Data
US 2015/0377745 A1 Dec. 31, 2015

(30) Foreign Application Priority Data
Feb. 19, 2013 (SE) ...................................... 1300126

(51) Int. Cl.
*G01M 99/00* (2011.01)
*G01M 13/00* (2006.01)
*G05B 23/02* (2006.01)

(52) U.S. Cl.
CPC ........... *G01M 99/005* (2013.01); *G01M 13/00* (2013.01); *G05B 23/024* (2013.01)

(58) Field of Classification Search
CPC .......................... G05B 23/024; G01M 99/005
USPC ........ 702/56, 179, 183, 182, 184; 714/1, 48, 714/49, 55, 57
See application file for complete search history.

(56) References Cited

U.S. PATENT DOCUMENTS 5,561,610 A * 10/1996 Schricker ................. G01D 3/08
340/679
5,835,886 A * 11/1998 Scheil ....................... G01D 3/08
702/179

(Continued)

OTHER PUBLICATIONS

Basim Al-Najjar and Imad Alsyouf, "Mechanistic model for predicting the CM parameter value: a case study," Conference Modelling in industrial maintenance and reliability, MIMAR 2004, Salford University, UK, pp. 7-12.

(Continued)

*Primary Examiner* — Carol S Tsai
(74) *Attorney, Agent, or Firm* — Dilworth & Barrese, LLP

(57) ABSTRACT

The present invention relates to a method and an apparatus for predicting the condition of a machine or a component of the machine based on measurements of a condition monitoring parameter. The apparatus comprising—a data storage (6) for storing a moving window including measurement values of the condition monitoring parameter,—a monitoring module (7) configured to determine when a measurement value exceeds a potential failure level at which damage of the machine or component is considered initiated, and to determine the point in time ($t_P$) when the monitoring parameter exceeded the potential failure level,—a data cleaning module (8) configured to discard a new measurement value if it is smaller than the latest stored measurement value in the moving window, to determine an expected value for the measurement based on a defined pattern for the condition monitoring parameter, which pattern reflects an expected behavior of the monitoring parameter after damage has been initiated, and the time elapsed since the point in time the monitoring parameter exceeded the potential failure level, and to discard the new measurement value if it deviates too much from the expected value, and to store not discarded measurement values in the moving window, and—a prediction module (10) configured to predict the level of the condition monitoring parameter at a future point in time based on the measurement values stored in the moving window.

9 Claims, 3 Drawing Sheets

(56) References Cited

U.S. PATENT DOCUMENTS

| | | | | |
|---|---|---|---|---|
| 5,838,561 | A * | 11/1998 | Owen | G05B 23/024 700/32 |
| 5,852,793 | A * | 12/1998 | Board | G01H 1/003 702/183 |
| 6,363,332 | B1 * | 3/2002 | Rangarajan | G05B 19/4063 701/31.9 |
| 6,370,957 | B1 * | 4/2002 | Filippenko | G01H 1/003 73/593 |
| 6,959,261 | B2 * | 10/2005 | Renner | G05B 23/0221 702/179 |
| 2002/0133320 | A1 | 9/2002 | Wegerich et al. | |
| 2004/0030524 | A1 | 2/2004 | Jarrell et al. | |
| 2004/0078171 | A1 | 4/2004 | Wegerich et al. | |
| 2004/0098233 | A1 | 5/2004 | Renner | |
| 2008/0027677 | A1 | 1/2008 | Miller et al. | |
| 2011/0285930 | A1 * | 11/2011 | Kimura | G09G 3/3648 349/43 |
| 2014/0074345 | A1 * | 3/2014 | Gabay | G07C 5/08 701/31.4 |

OTHER PUBLICATIONS

Basim Al-Najjar, "Prediction of the vibration level when monitoring rolling element bearings in paper mill machines," International Journal of Condition Monitoring and Diagnostic Engineering Management, (COMADEM). vol. 4, No. 2, pp. 19-27, 2001.

* cited by examiner

METHOD AND AN APPARATUS FOR PREDICTING THE CONDITION OF A MACHINE OR A COMPONENT OF THE MACHINE

FIELD OF THE INVENTION

The present invention relates to a method and an apparatus for predicting the condition of a machine, such as a rotating machine, or a component of the machine, for example, a bearing, gear, gearbox, pump, electrical motor, turbine, or compressor.

PRIOR ART

In production processes it is necessary to apply condition monitoring (CM) to reduce downtime and prolong production time, as well as to improve the productivity and product quality in order to reduce production cost and increase profit continuously. Thus, the condition of a machine and/or significant components of the machine should be monitored during the lifetime of the machine.

The condition of a mechanical component degrades gradually through structural, surface and subsurface deterioration. The time and extent of deterioration depends on many factors, such as construction, material, operating and environmental conditions. The life of a machine or a significant component includes three different phases before a failure has occurred; no damage, damage initiation and development, and imminent failure. The second phase often represents more than half the total usable life time of the component. The condition of a component is usually assessed based on measurements of one or more condition monitoring parameters, such as vibration, temperature, sound, or Shock Pulse Measurements (SPM). FIG. 1 shows an example of how the value of the condition monitoring parameter may vary over time before and after damage has been initiated. The level of the condition monitoring parameter is usually considered stationary during the first phase, prior to the initiation of the damage, and the level is fluctuating about a mean value $x_o$, as seen from the figure. However, during the second phase, i.e. after initiation of the damage and during its development, the level of the condition monitoring parameter is increasing with operating time, as illustrated in the figure.

The machine or the significant component must be replaced when the value of the condition monitoring parameter is close to or passes a defined replacement level. However, the time needed by a component to approach the replacement level is a random variable. To be able to determine the most cost effective point in time for maintenance, i.e. repair or replacement, of the component, it is necessary to predict the level of the condition monitoring parameter during the near future. Based on the predicted condition monitoring parameter it is possible to assess the optimal moment of replacement.

The article "Mechanistic model for predicting the CM parameter value: a case study" by Basim Al-Najjar and Imad Alsyouf, Conference Modeling in industrial maintenance and reliability, MIMAR 2004, Salford University, UK, pages 7-12, discloses a method for predicting condition monitoring parameters for a rotating machine based on measurements of the condition monitoring parameters. The method detects when damage of the components has been initiated. The time elapsed from the damage have been initiated is estimated. A deterioration factor is estimated based on the current machine load, future load, and the previous change in the deterioration rate, and the gradient of deterioration. A value in close future, e.g. at the next planned stoppage or the next measuring opportunity, of at least one CM parameter is predicted. The prediction is made using a dynamic mathematic model disclosed in the article. The predicted value of the CM parameter is used to determine the condition of the machine, or its components in the close future, which can be used for planning the future maintenance of the machine. However, the result of the prediction depends on the measurements used as input data to the dynamic model. The raw measurement data is often influenced by disturbances that affect the result of the prediction. In order to achieve a satisfactory result of the prediction, it is necessary to identify a set of measurements whose values reliably represents the deterioration process, i.e. damage under development. Thus, the measurement data has to be treated before they are used as input data to the dynamic model.

US2004/0098233A1 discloses a system for tracking small changes in technical processes, machines or the like, based on measurement data. The measurement data are treated before they are used for the tracking. Validity conditions are defined for the measured data, and the measurement data is only utilized if their validity conditions are fulfilled. A validity condition for the measured data is, for example, a value going higher or lower than a special measured value. The purpose of the treatment of the measuring data is to increase the chances to track small changes in the condition of the process or machine, which otherwise is difficult to detect due to noise and other disturbances.

OBJECT AND SUMMARY OF THE INVENTION

An object of the present invention is to improve the prediction of a condition monitoring parameter, and accordingly to improve the estimation of the most cost effective point in time for replacement or maintenance of the machine or significant components of the machine.

According to one aspect of the invention, this object is achieved by a method as defined herein.

The measurement data used for the prediction is cleaned in such a way that an optimal prediction is achieved. If there is damage in any part of the machine, the measurements should be increasing because any damage in a machine component is irreversible, i.e. it cannot be healed by itself, which should make the values of the measurements non-decreasing in time. During the first phase, measured data are cleaned by only selecting measurements with increasing values, i.e. values which are larger than the values selected during the previous measuring moments. Thus, measurements that are contaminated by machine internal or external disturbing factors are discarded. The selected values are stored in a moving window adapted to store a predetermined number of measurement values. When the moving window is full, the oldest measurement value is always discarded when a new value is stored in the moving window. Thus, the number of stored measurements is the same over time.

The prediction starts when the value of the measured condition monitoring parameter has exceeded a potential failure level, i.e. damage is initiated, at which a potential failure of the machine or component is considered initiated. The potential failure level can, for example, be a predefined value determined based on previous measurements of the parameter. During the seconds phase, in addition to only selecting measurements with increasing values, the measurements are cleaned by discarding measurement value that deviates too much from an expected value of the monitoring parameter. The expected value is determined based on a predefined pattern that reflects an expected behavior of the monitoring parameter after damage has been initiated, and the time elapsed between the point in time the measurement was made and the point in time the monitoring parameter exceeded the potential failure level. Thereby, faulty measurement values are discarded. Thus, the measurement values must fulfill two different conditions to be allowed to be stored in the moving window; the values must be increasing and they are not allowed to deviate too much, i.e. not more than a certain amount, from their expected values. This amount can e.g. be a predetermined value, or can be decided dynamically.

The prediction is made based on the measurement values stored in the moving window, which are all cleaned from disturbances. Thus, the prediction is improved.

Due to the fact that the measurement data is cleaned during also the first phase, it is possible to start the prediction based on the measurement values stored in the moving window as soon as the value of the monitoring parameter has passed the potential failure level. Thus, the prediction is based on measurement values stored during the first phase as well as during the second phase. It is advantageous to start the prediction as early as possible to be able to provide early warnings and maintenance instructions to the user.

According to an embodiment of the invention, the moving window includes at least three stored measurement values. Due to the cleaning of the measurements, the number of measurements needed to achieve a prediction good enough is reduced. Three measurements values, which have been cleaned according to the invention, are enough to provide a reliable result.

According to an embodiment of the invention, the defined pattern for the condition monitoring parameter is a curve which starts increasing at the point in time the monitoring parameter exceeded the potential failure level. The curve describes the value of the monitoring parameter versus time elapsed since the point in time the monitoring parameter exceeded the potential failure level. The shape of the pattern, and accordingly of the curve, depends, for example, on the type of parameter, the type of damage, for example crack or wear, and the type of deterioration process, the machine load and velocity, and the type and quality of the machine or component. For many type of faults, the curve is exponentially increasing. The curve is, for example, determined based on previous measurements of the same condition monitoring parameter for the same or similar type of machine or component. The curve begins at the same time as it is detected that a damage has been initiated, i.e. at the point in time the monitoring parameter exceeded the potential failure level, and the curve is increasing during the entire second phase. The expected value of a measurement is determined based on the curve and the time of the measurement. Thus, it is easy to determine the expected value of the measurement.

According to an embodiment of the invention, the new measurement value is discarded if the measurement deviates from the expected value with more than a limit value. The limit value can be predetermined or be dynamically calculated during the second phase.

According to an embodiment of the invention, the method further includes: generating a message to a user to control the measurement and provide a new measurement when it is detected that the measurement value deviates too much from the defined pattern, receiving a new measurement value, comparing the new measurement value with the expected value determined in accordance with the defined pattern for the condition monitoring parameter, and generating a warning if the new measurement value also deviates too much from the expected value. Otherwise the oldest of the stored measurement value in the moving window is replaced with the new measurement value. A new measurement is made in case the value of a measurement deviates too much from the expected value during the second phase. Alternatively, a new measurement is taken automatically when it is detected that a measurement deviates too much from the expected value. By, this embodiment a faulty measurement is discarded and replaced with a new deterioration-relevant measurement. If the new measurement also deviates too much from its expected value, a warning is generated to the user. This can either means that something is wrong with the measuring equipment, or that the damage is developing much faster than expected and a maintenance action is urgently needed.

According to an embodiment of the invention, the method further comprises: comparing the predicted level of the condition monitoring parameter with at least one limit level for the condition monitoring parameter, repeating the previous steps at least until the predicted level of the condition monitoring parameter exceeds the limit level, and generating a message regarding a maintenance action when the predicted level of the condition monitoring parameter exceeds the limit level. The limit level is, for example, a warning level which is below the replacement level of the component or machine. It is also possible to have several limit values between the potential failure level and a replacement level. This embodiment makes is possible to propose a maintenance action with enough lead time at a cost-effective point in time.

According to an embodiment of the invention, the machine is a rotating machine and the measurement values any of vibration measurements, temperature measurements, sound measurements, and shock pulse measurements.

According to another aspect of the invention, this object is achieved by a computer program product directly loadable into the internal memory of a computer, or through Remote desktop, web service, or Cloud, comprising software for performing the steps of the method, when said program product is run on the computer.

According to another aspect of the invention, this object is achieved by a computer-readable medium, having a program recorded thereon, where the program is to make a computer perform the steps of the method, when said program is run on the computer.

According to another aspect of the invention, this object is achieved by an apparatus as defined herein.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

Figure 1:
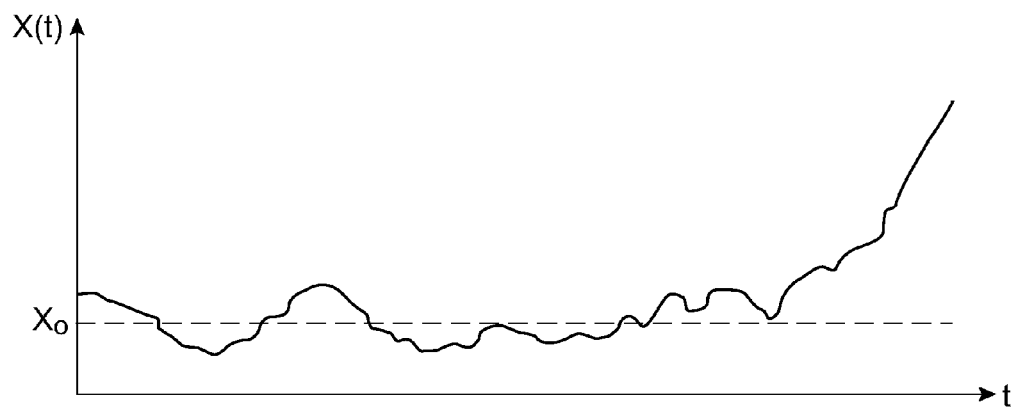
FIG. 1 shows an example on how measurement of a condition monitoring parameter may vary over time before and after damage has been initiated.
Figure 2:
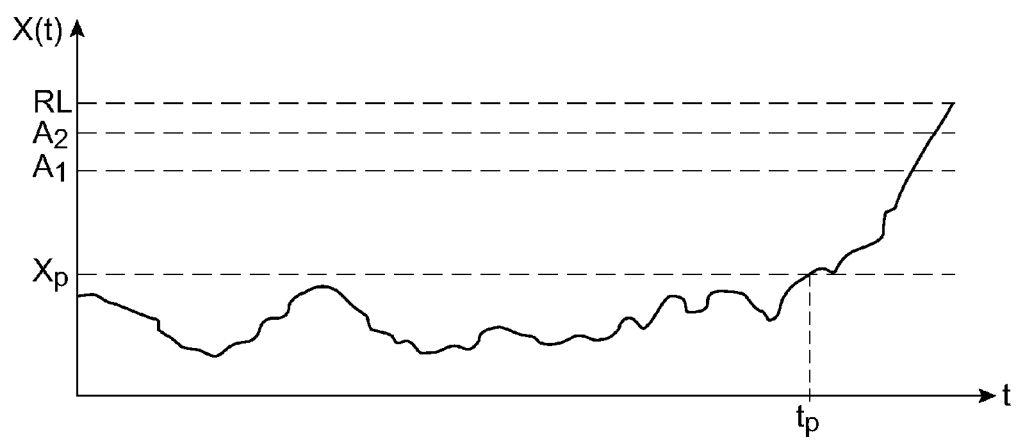
FIG. 2 shows an example of how measurement of a condition monitoring parameter may vary over time in relation to a defined potential failure level and limit levels for generating maintenance instructions.

FIG. 2 shows an example of how measurement of a condition monitoring parameter may vary over time before and after damage has been initiated. A potential failure level $X_P$ of a condition monitoring parameter has been defined, at which level damage of the machine or component is considered initiated. Further two limit levels $A_1$, $A_2$ for generating maintenance instructions have been defined. A replacement level RL is also shown in the figure. When the replacement level has been approached or reached, the component or the machine must be replaced. The number of limit levels for generating maintenance instructions may vary. In one embodiment, only one limit level may be defined. It is also possible to have several limit levels, and to generate a special message for every particular limit level and component in a machine, identifying which machine (if there are several machines included), showing component location, component damage severity, number of days left until the time of the predicted level of the condition monitoring parameter, and increasingly maintenance alert.

Figure 3:
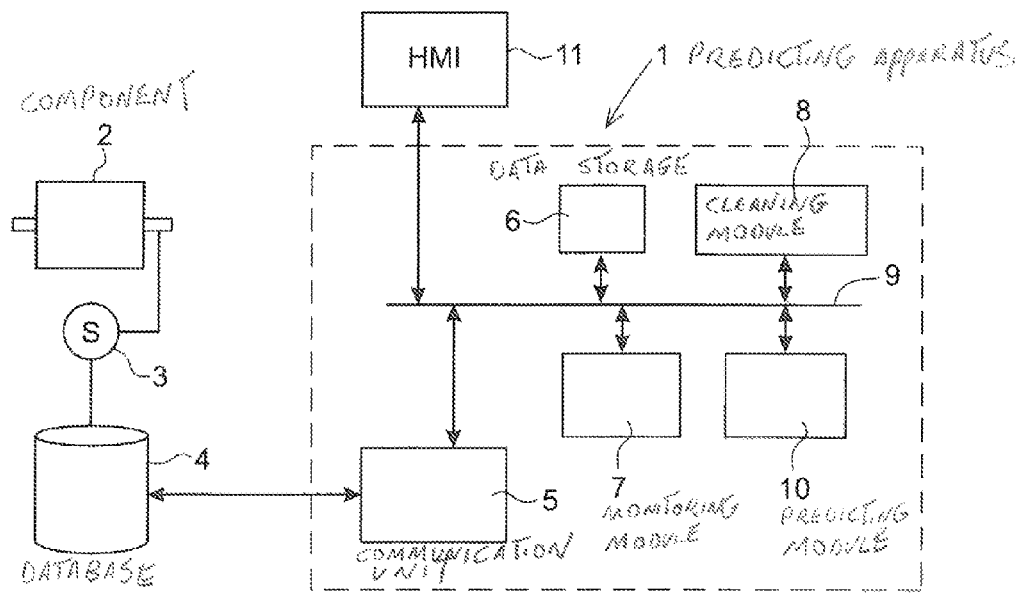
FIG. 3 shows a block diagram of an apparatus for predicting the condition of a machine or a component of the machine according to an embodiment of the invention.

FIG. 3 shows an example of an apparatus 1 for predicting the condition of a component 2, such as a rolling element bearing, of a machine according to an embodiment of the invention. The apparatus includes hardware, for example a computer including a processor, and software modules executed by the computer. A condition monitoring parameter, such as vibration level, temperature level, sound level, or SPM level, is continuously or periodically measured by means of a sensor 3. The condition monitoring parameter is, for example, measured once each month. The measurement values and information on the time when they were measured are stored in a company database 4. The apparatus 1 includes a communication unit 5 configured to communicate with the database 4, and to retrieve the measurement values and the time for the measurement. Alternatively, the machine sends data including the measurement values and the time for the measurement to the apparatus, or the measurement values and the time for the measurement are sent to the apparatus through special files. In that case the communication unit receives the measurement data.

The apparatus includes a data storage 6 configured to store a moving window including a plurality of measurement values of the condition monitoring parameter. The moving window is adapted to store a predetermined number of measurement values, for example three measurement values. The predicted values of the condition monitoring parameter, time of damage initiation, i.e. the time when the monitoring parameter exceeded the potential failure level $X_P$ shown in FIG. 2, time of the predicted value, the discarded values of the condition monitoring parameter and other analysis results can also be saved in data storage 6. When the moving window is full, the oldest measurement value is removed from the moving window when a new value is stored in the moving window. Thus, the number of stored measurements is the same over time. Preferably, the moving window is adapted to store at least three measurement values. The data storage is, for example, a register.

The apparatus further includes a monitoring module 7 configured to monitor the measurement values and to determine which measurement value exceeds the potential failure level $X_P$, at which damage of the component is considered initiated, and to determine the point in time $t_P$ the monitoring parameter exceeded the potential failure level. The monitoring module 7 compares new measurements with the potential failure level $X_P$, and when a measurement value exceeds the potential failure level, damage has been initiated and the second phase has started. The point in time when the monitoring parameter exceeded the potential failure level is the point in time when the potential failure started. This time can be determined based in the measurement values and the time for the measurements.

The apparatus further includes a data cleaning module 8 for cleaning the obtained measurement values. The data cleaning module is configured to compare a new measurement value of the condition monitoring parameter with the latest stored measurement value in the moving window, and to discard the measurement if it is smaller than the latest stored measurement value. Discarded values are not stored in the mowing window. However, it is possible to store the discarded values in the data storage 6 to be used later for performing analyses of the measuring values.

Thus, the measurements that are contaminated by machine internal or external disturbing factors are discarded, i.e. they are not stored in the moving window and not used in the prediction. The data cleaning module is configured to store the measurement values in the moving window if they are larger than the latest stored measurement values. The measurement values are stored in the moving window until the moving window is full. For example, if the moving window is adapted to store three measurements, the moving window is full when three measurements are stored in the moving window. If the moving window is full, the oldest of the measurement values stored in the moving window is moved from the moving window and instead the new measurement value is stored in the moving window, i.e. the oldest of the measurement values stored in the moving window is replaced with the new measurement. The data cleaning module is configured to continue to store the measurement values in the moving window, if they are larger than the latest stored measurement values, as long as damage has not been initiated, i.e. the monitoring parameter has not yet exceeded the potential failure level.

Figure 4:
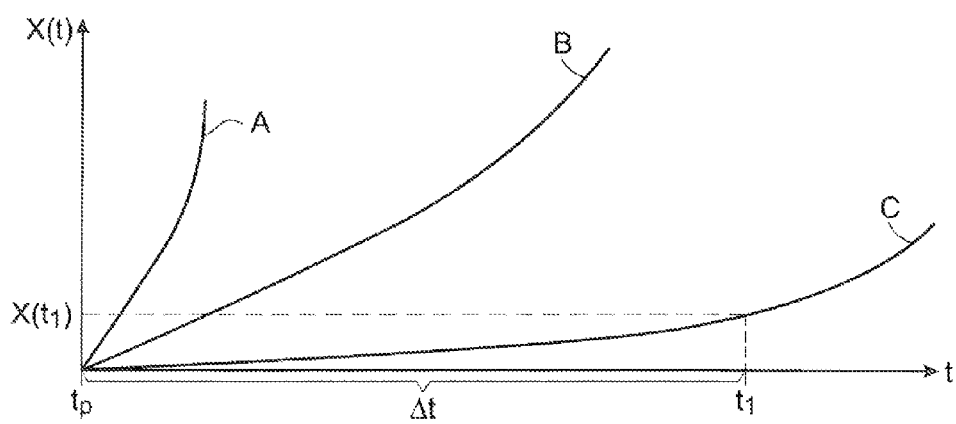
FIG. 4 show three examples of patterns for the condition monitoring parameter, which reflects an expected behavior of the monitoring parameter after damage has been initiated.

The data cleaning module is configured to further clean measurement values obtained after the point in time when damage has been initiated, i.e. after the monitoring parameter has exceeded the potential failure level. If damage has been initiated, the cleaning module is configured to determine an expected value for the measurement based on a defined pattern for the condition monitoring parameter, which reflects an expected behavior of the monitoring parameter after damage has been initiated, and the time elapsed since the point in time the monitoring parameter exceeded the potential failure level. The time elapsed since the point in time the monitoring parameter exceeded the potential failure level is determined based on the time for the measurement. The pattern is, for example, a curve which starts increasing at the point in time $t_P$ the monitoring parameter exceeded the potential failure level. FIG. 4 shows three examples of suitable patterns A, B, C for the condition monitoring parameter after damage has been initiated. The pattern A is a rapidly, exponentially increasing curve. The pattern B is a medium, exponentially increasing curve, and the pattern C is a slowly, exponentially increasing curve. The shape of the pattern, and accordingly of the curve, depends, for example, on the type of parameter, the type of damage, for example crack or wear, and the type of deterioration process, the machine load and velocity, and the type and quality of the machine or component. A suitable pattern can be defined based on previous measurements of the condition monitoring parameter from the point in time when damage was initiated until the component must be replaced. The previous measurements can belong to the machine/component under monitoring, or past data from other identical or similar machines/components. As seen from the example shown in FIG. 2, the measurement values are exponentially increasing after the failure has been initiated, and accordingly the defined pattern should preferably also be exponentially increasing.

If the pattern is defined as the curve C, and a measurement is made at the time $t_1$, an expected value $X(t_1)$ for the measurement is determined based on the curve C and the time $\Delta t$ elapsed since the point in time $t_P$ when the monitoring parameter exceeded the potential failure level as seen in FIG. 4.

The data cleaning module is configured to discard the new measurement value if it deviates too much from the expected value, i.e. if the new measurement value deviates from the expected value with more than a limit value, and to replace the oldest of the measurement values stored in the moving window with the new measurement value, if the measurement value does not deviates too much from the expected value. Thus, if the new measurement value does not deviate from the expected value with more than the limit value, the oldest of the measurement values stored in the moving window is thrown away and the new measurement value is stored in the moving window. This means that after the point in time when the monitoring parameter exceeded the potential failure level, the measurement value is only allowed to be stored in the moving window if the measurement fulfills two criteria; the value must be larger than the value of the latest stored measurement, and the value should no deviate too much from the defined patter. If both criteria are fulfilled, the measurement is stored in moving window. At abnormal values, i.e. if measurement value deviates too much, from the expected value, the apparatus generates a message to the user, for example, to request that the measurement is made again. The abnormal values of a measurement can be different based on the level of the condition monitoring measurement value, and time elapsed since the point in time the monitoring parameter exceeded the potential failure level, for example, it can be four times the average increment of the last three measurement values, or it can be 100% of the last measurement value. Also, the abnormal values can be dissimilar for different machines and components, therefore, abnormality can be decided dynamically.

The apparatus includes a predicting module 10 configured to predict the level of the condition monitoring parameter at a future point in time based on the measurement values stored in the moving window. The predicting module 10 is configured to start the prediction when the condition monitoring parameter has exceeded the potential failure level $X_P$ and the moving window is full with measurements of the condition monitoring parameter values. If both criteria mentioned above are fulfilled, the measurement is stored in moving window and a prediction of the condition monitoring parameter value is conducted.

The modules 5, 6, 7, 8 and 10 can be implemented in software, hardware or a combination thereof. The units and modules 5-8, 10, and 11 can be interconnected, for example, via an internal bus 9.

A detailed example of how the prediction can be carried out is described in the article "Mechanistic model for predicting the CM parameter value: a case study" by Basim Al-Najjar and Imad Alsyouf. In this example, a deterioration factor is estimated based on the current machine load, future load, the previous change in the deterioration rate, and the gradient of deterioration. The predicting module 10 predicts the value of the condition monitoring parameter in the close future, for example, at the next planned stoppage or measuring opportunity, based on the measurements stored in the moving window, the estimated time elapsed from the time of damage initiation, and the estimated deterioration factor using a mathematic model. The model is dynamic because all model's parameters and constants are re-calculated at every new measurement (and prediction) which means that the prediction of the condition monitoring level follows changes in the behavior of the component deterioration. Also, the model responds to changes in production speed and load. Due to the fact that the prediction is based on the measurement values in the moving window, it is ensured that the prediction uses recent measurements and always excludes older measurement when new measurements are done.

The apparatus further comprises a Human Machine Interface (HMI) 11 configured to provide messages regarding maintenance actions and warnings to a user. The human machine interface 11 is, for example, a display screen. The human machine interface 11 may also be configured to generate a message regarding if a measurement value deviates too much from an expected value for the measurement based on a defined pattern for the condition monitoring parameter, and to generate a message regarding informing a user that no prediction of the condition monitoring parameter value has been made due to the fact that the moving window is not full, i.e. the number of measurements is less than the predetermined number, for example, three or four measurements.

The monitoring module 7 is configured to compare the predicted level of the condition monitoring parameter with at least one limit level $A_1$, $A_2$ for the condition monitoring parameter, and to generate a message regarding a maintenance action when the predicted level of the condition monitoring parameter exceeds the limit level. It is also possible to have several levels with different degree of severity. The monitoring module 7 judges the new predicted value whether it demands maintenance or not through comparing the new predicted value with already setup levels of severity.

Figure 5:
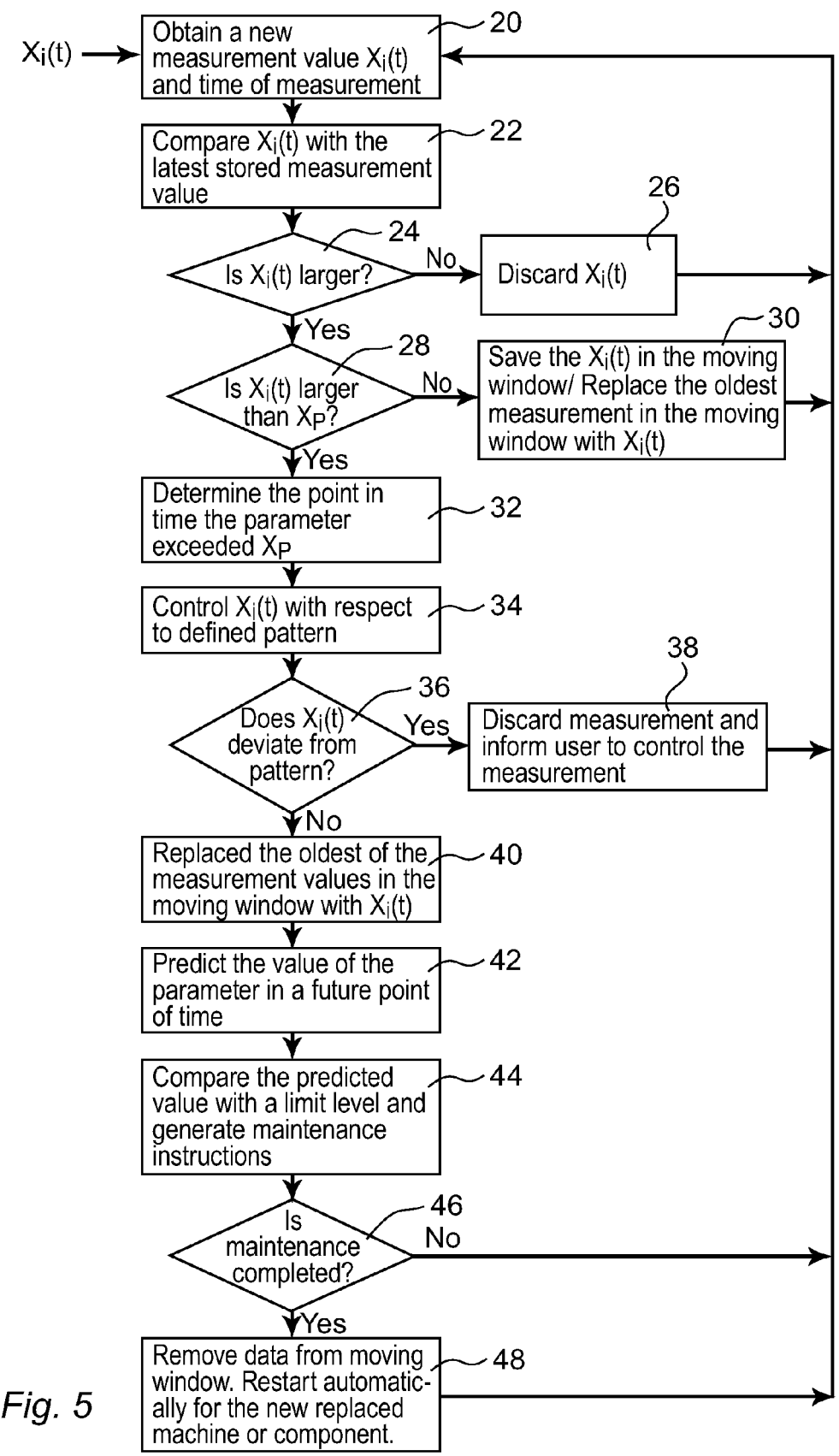
FIG. 5 shows a flow chart of a method for predicting the condition of a machine or a component of the machine according to an embodiment of the invention.

FIG. 5 is a flow chart illustration of a method and a computer program product according to an embodiment of the present invention. It will be understood that each block of the flow chart can be implemented by computer program instructions.

A potential failure level $X_P$ for the condition monitoring parameter been defined beforehand. One or more limit values that lie between the replacement level RL and potential failure level $X_P$ can also been defined beforehand. The potential failure level $X_P$ is a level of the monitoring parameter at which a potential failure is considered initiated. From the point in time the condition monitoring parameter exceeds the potential failure level damage of the component or machine is under development. A pattern for the condition monitoring parameter, which reflects an expected behavior of the monitoring parameter after damage has been initiated, has been defined beforehand or is defined dynamically.

A new measurement value $X_i(t)$ of the condition monitoring parameter is obtained, block 20. The measurement value can be retrieved or received from the company database, the machine or a special file. The measurement values also include information on the point in time when the measurement was made. The new measurement value $X_i(t)$ is compared with the latest stored measurement value in the moving window, block 22. If the new measurement value is smaller than the latest stored measurement value, the measurement is discarded, block 24, 26. If the new measurement value is larger than the latest stored measurement value in the moving window, the new measurement value $X_i(t)$ is compared with the potential failure level $X_P$ of the condition monitoring parameter, block 28. If the measurement value $X_i(t)$ is below the potential failure level, the measurement is stored in the moving window together with the time the measurement was made, block 30. If the moving window is full, the oldest of the measurement values stored in the moving window is replaced with the new measurement value. The blocks 20-30 are repeated until the new measurement value exceeds the potential failure level of the condition monitoring parameter.

When the measurement value is larger than the potential failure level, the point in time when the condition monitoring parameter exceeded the potential failure level $X_P$ is determined, unless this has not already been done for a previous measuring value, block 32. The potential failure level $X_P$ can be different for different machines and components. This is why it can always be accommodated with respect to each machine or a component in the machine. The time elapsed since the point in time the monitoring parameter exceeded the potential failure level is determined for the new measurement value based on the differences in time between the times the measurements were done and the time the monitoring parameter exceeded the potential failure level. An expected value for the measurement is determined in accordance with the defined pattern for the condition monitoring parameter and the time elapsed since the point in time the monitoring parameter exceeded the potential failure level, block 34. The new measurement value is compared with the determined expected value, and it is determined whether the measurement deviates too much from the expected value, i.e. whether the measured value deviates from the expected value with more than a limit value, block 34.

If the new measurement $X_i(t)$ deviates too much from pattern, the measurement is discarded, and the user is requested to control the measurement and/or to repeat the measurement, block 36, 38. If the new measurement $X_i(t)$ deviates too much from pattern, perhaps the measurement was wrongly measured. If the measurement was wrongly measured, a new correctly measured measurement value $X_{i+1}(t)$ will probably not deviate too much from the expected value. However, if the value was correctly measured, the new measurement value $X_{i+1}(t)$ will still deviate too much from the expected value. In such case, it might be necessary to provide an immediate control of the measuring system or a maintenance action, and a warning is generated and displayed to the user.

If the measurement value $X_i(t)$ does not deviates too much from the pattern, the measurement value is stored in the moving window together with the time the measurement was made, by replacing the oldest measurement values stored in the moving window with the new measurement value, block 36, 40.

When the condition monitoring parameter exceeds the potential failure level $X_P$, the prediction of the condition monitoring parameter begins, block 42. The prediction is repeated for each new measurement value, which does not deviate too much from the defined pattern. The prediction is carried out based on the measurement values stored in the moving window. The prediction determines the value of the condition monitoring parameter in a future point of time, for example, the next time the measuring is to be carried out.

The predicted value is compared with at least one limit value A1 for the condition monitoring parameter, block 44. The limit value is, for example, a replacement level for the component. If the predicted value is close to or exceeds the limit value, maintenance instructions are generated and displayed to the user. For example, if the predicted value approaches or exceeds the replacement level for the component, an instruction is generated which requests the user to immediately replace the component. Also, if the predicted value exceeds any of the limit values that lie between the replacement level and the potential failure level for the component, an instruction is generated which requests the user to either wait, start plan maintenance action or immediately replace the component. The method is repeated until maintenance has been done, for example, the component has been replaced, block 46. When maintenance has been done, measuring data is removed from the moving window and the program is automatically restarted for the new replaced machine or a component, block 48.

For example all the levels involved in the apparatus, such as the potential failure level $X_P$ and warning levels, such as limit values are all changeable with respect to the user experience, machine or component significance, failure consequences. The number of measurements needed to fill up the moving window can be reduced and increased depending on needs.

If the new measurement Xi(t) deviates too much from pattern during the period when the value of the condition monitoring is still below the potential failure level $X_P$, the measurement is discarded, and the user is requested to control the measurement and/or to repeat the measurement. If the new measurement deviates too much from pattern, perhaps the measurement was wrongly measured. If the measurement was wrongly measured, a new correctly measured value will probably not deviate too much from the expected value. However, if the value was correctly measured, the new measurement value will still deviate too much from the expected value. In such case, it might be necessary to provide an immediate control of the measuring system or maintenance action, and a warning is generated and displayed to the user. If the value of the measurement deviates too much but it is still below replacement level, the value of the condition monitoring parameter in the close future is predicted and new warning message is generated.

With discarding a measurement value is meant that the measurement value is discard with regard to the prediction. The discarded measurement can be saved and used for other purposes.

The steps defined in the claims can be carried out in different order. For example, the prediction can be carried out as soon as the new measurement value has exceeded the potential failure level of the condition monitoring parameter, i.e. the step h can be carried out between the steps d and e. The measurement values can also be gathered from additional condition monitoring parameters, for example, acoustic emission, thermography, oil debris particles.

The invention claimed is:

1. A computer-readable medium having a program recorded thereon, wherein the program makes a computer perform a method for predicting the condition of a machine or a component of the machine based on measurements of a condition monitoring parameter, a potential failure level of the condition monitoring parameter has been defined, at which level damage of the machine or component is considered initiated, and a pattern for the condition monitoring parameter has been defined, which pattern reflects an expected behavior of the monitoring parameter after damage has been initiated, plurality of measurement values of the condition monitoring parameter have been stored in a moving window, the method comprising the steps of a) obtaining a new measurement value of the condition monitoring parameter, b) comparing the new measurement value with the latest stored measurement value, and discard the new measurement value if it is smaller than the latest stored measurer measurement value, and otherwise replace the oldest of the measurement values stored in the moving window with the new measurement value, c) comparing the new measurement value with the potential failure level of the condition monitoring parameter, and repeating the steps (a)-(c) until the new measurement value exceeds the potential failure level of the condition monitoring parameter, d) determining the point in time when the monitoring parameter exceeded the potential failure level, e) receiving a new measurement value of the condition monitoring parameter, f) comparing the new measurement value with the latest stored measurement value, and discarded the new measurement value if it is smaller than the latest stored measurement value, g) comparing the new measurement value with an expected value determined in accordance with said defined pattern for the condition monitoring parameter and the time elapsed since the point in time the monitoring parameter exceeded the potential failure level, and discard the new measurement value if it deviates too much from the pattern, and otherwise replace the oldest of the measurement values stored in the moving window with the new measurement value, and h) predicting level of the condition monitoring parameter at a future point in time based on the measurement values stored in the moving window, when said program is run on the computer.

2. The computer-readable medium according to claim 1, wherein the moving window includes at least three stored measurement values.

3. The computer-readable medium according to claim 1, wherein said defined pattern for the condition monitoring parameter is a curve which starts increasing at the point in time the monitoring parameter exceeded the potential failure level.

4. The computer-readable medium according to claim 1, wherein the new measurement value deviates too much from the expected value if the measurement deviates from the expected value with more than a limit value.

5. The computer-readable medium according to claim 1, wherein if the measurement deviates too much from the expected value, the step (g) further includes:

generating a message to a user to control the measurement and provide a new measurement, receiving a new measurement value, comparing the new measurement value with an expected value determined in accordance with said defined pattern for the condition monitoring parameter and the time elapsed since the point in time the monitoring parameter exceeded the potential failure level, and generating a warning if the new measurement value also deviates too much from the expected value, and otherwise replace the oldest measurement value stored in the moving window h the new measurement value.

6. The computer-readable medium according to claim 1, wherein the method further comprises the steps of:

i) comparing the predicted level of the condition monitoring parameter with at least one limit level for the condition monitoring parameter, repeating steps (e)-(i) at least until the predicted level of the condition monitoring parameter exceeds the limit level, and j) generating a message regarding a maintenance action when the predicted level of the condition monitoring parameter exceeds said limit level.

7. The computer-readable medium according to claim 1, wherein the machine is a rotating machine and the condition monitoring measurement values are any of vibration measurements, temperature measurements, sound measurements, and shock pulse measurements.

8. An apparatus for predicting the condition of a machine or a component of the machine based on measurements of a condition monitoring parameter, comprising:

a communication unit configured to obtain measurement values of the condition monitoring parameter, a data storage for storing a moving window including measurement values a monitoring module configured to monitor the measurement values and to determine when a measurement value exceeds a potential failure level at which damage of the machine or component is considered initiated, and to determine the point in time when the monitoring parameter exceeded the potential failure level, a data cleaning module configured to discard a new measurement value if it is smaller than the latest stored measurement value in the moving window, to determine an expected value for the measurement based on a defined pattern for the condition monitoring parameter, which pattern reflects an expected behavior of the monitoring parameter after damage has been initiated, and the time elapsed since the point in time the monitoring parameter exceeded the potential failure level, to discard the new measurement value if it deviates toe much from the expected value, to store not discarded measurement values in the moving window, and to replace the oldest of the measurement values stored in the moving window with the new measurement value if the moving window is full, and a prediction module configured to predict the level of the condition monitoring parameter at a future point in time based on the measurement values stored in the moving window.

9. The apparatus according to claim 8, wherein the apparatus further comprises a human machine interface configured to provide messages regarding maintenance actions to a user, and the monitoring module is configured to compare the predicted level of the condition monitoring parameter with at least one limit level for the condition monitoring parameter, and to generate a message regarding a maintenance action when the predicted level of the condition monitoring parameter exceeds said limit level.

* * * * *